Patented Dec. 30, 1952

2,623,831

UNITED STATES PATENT OFFICE 2,623,831

ANTISTRIPPING AGENTS FOR ASPHALTS

Louis A. Mikeska, Westfield, N. J., assignor to Standard Oil Development Company, a corporation of Delaware No Drawing. Application November 23, 1948,
Serial No. 61,735

6 Claims. (Cl. 106—273)

The object of this invention is a composition of matter composed of asphalt and the free amine base or a salt of the condensation product of ethylene diamine and an alkylthio substituted higher alkyl halide containing only carbon, hydrogen, oxygen and halogen as an anti-stripping addition agent for asphalts.

It is well known that some alkyl amines make anti-stripping addition agents for asphalts. The higher molecular weight alkyl halides, particularly of the primary and secondary classes, and which may contain certain other substituents that are needed as intermediates in the preparation of such amines, are expensive and difficult to obtain. A more readily available and more economical source of this type of alkyl halide intermediates was desired for this purpose.

According to this invention, effective antistripping addition agents for asphalts can be prepared by the condensation of various types of alkyl halides with polyalkylene polyamines such as ethylene diamine, diethylene triamine, triethylene tetramine, and mixtures thereof.

It should be understood that wherever the term "condensation product" appears in this specification, it is intended to mean the free amine base obtained by condensing the halide with an amine compound. As is well known, the initial product obtained by such a direct condensation will be an amine hydrohalide salt. It is common expediency to treat the reaction mixture directly with a strong base such as sodium hydroxide and thereafter isolate the free amine base.

One very good method of preparing the desired effective anti-stripping addition agents is based on the condensation of high molecular weight alkyl halides with ethylene diamine or with some other polyalkylene poylamines. The amine hydrohalide salts thus obtained may be used as such or they may be converted by neutralization into the free bases which may be used as such or they may be in turn converted into other salts, preferably the organic carboxylic acid salts or sulfonic acid salts, prior to their blending with asphalts. The products, when properly prepared, consist primarily of mono alkylated ethylene diamine or polyethylene polyamines, though polyalkylated products are also present.

The alkyl halides which are particularly valuable for use in preparing these improved anti-stripping agents may contain from 10 to 24 carbon atoms. Lower molecular weight products give poor results. The halide atom should be located in a primary or secondary position. The tertiary halides give inferior reaction products as they tend to undergo dehydrohalogenation rather than condensation when treated with the polyamines.

Various other substituents may also be present. These include such groups as phenyl, phenoxy, alkyl substituted phenyl, hydroxy, alkoxy, mercapto, alkyl substituted mercapto, and various others. Their arrangement in the molecule is not particularly critical. However, the halide atom to be reacted with the polyamine must be attached directly to an alkyl group.

These products may obviously be prepared by other known synthetic reactions and the invention is not intended to be limited to any particular mode of producing the useful compounds.

That the products thus obtained are highly effective as anti-stripping addition agents for asphalts may be seen from the following detailed examples and the evaluation data given below.

A. *Condensation of high molecular weight unsubstituted alkyl halides and polyalkylene polyamines*

EXAMPLE I

Ethylene diamine was condensed with octadecyl bromide by heating an equimolar mixture of the two ingredients at 140° C. for one hour. The amine hydrobromide thus obtained was converted into the free base by treating the hydrobromide with a slight excess of sodium hydroxide. The free amine base was obtained as a viscous yellow oil. Its effectiveness as an asphalt antistripping addition agent may be seen from the evaluation data given below. Trap-rock containing 2% water and 6% asphalt cut back was used in the evaluation. Equimolar proportions of oleic acid and the free amine obtained by the above described procedure were mixed and the resulting salt product likewise tested as an asphalt antistripping agent.

| Product Tested | Percent Conc. in Asphalt | Mixing Ability | Resistance to Stripping After— | | |
|---|---|---|---|---|---|
| | | | 0 Hr. Cure | 1 Hr. Cure | 2 Hrs. Cure |
| Free Amine | 2 | 95+ | 95+ | 100 | 100 |
| Do | 1 | 95 | 80 | 100 | 100 |
| Do | 0.5 | 95 | 30 | 95 | 100 |
| Do | 0.25 | 85 | 10 | 90 | 100 |
| Oleic Acid Salt | 2 | 95+ | 80 | 95+ | 100 |
| Do | 1 | 90 | 5 | 60 | 95 |
| Do | 0.5 | 85 | 5 | 50 | 95 |
| Asphalt without any addition agent | 0 | 90 | 5 | 10 | 20 |

The figures in the last four columns denote the percentage of the rock aggregate covered by the asphalt after the stated time of cure. The untreated asphalt cut back would show about 20% coverage after 2 hours' cure. Thus it is seen that both the free base, and the oleic acid salt are highly effective as asphalt addition agents.

B. *Condensation of alkoxy-hydroxy alkyl halides and polyalkylene polyamines*

Products containing primary chloride groups can be readily prepared from alcohols by condensing the latter with epichlorhydrin in the presence of an appropriate catalyst. On treating the halogenated products thus obtained by this condensation with ammonia or with polyalkylene polyamides, such as ethylene diamine, amino derivatives are thus obtained which are highly effective as asphalt addition agents.

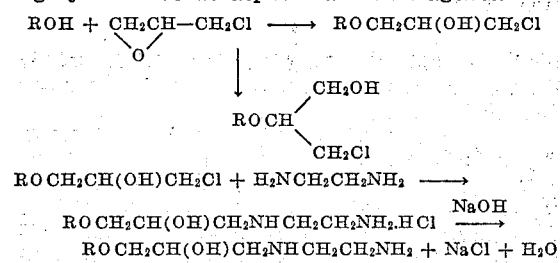

$$ROCH_2CH(OH)CH_2Cl + H_2NCH_2CH_2NH_2 \longrightarrow$$
$$ROCH_2CH(OH)CH_2NHCH_2CH_2NH_2 \cdot HCl \xrightarrow{NaOH}$$
$$ROCH_2CH(OH)CH_2NHCH_2CH_2NH_2 + NaCl + H_2O$$

The chemical equations shown above probably represent the general nature of the reactions taking place. It is quite probable, however, that a mixture of reaction products is obtained. Various types of alcohols may be used for the purpose indicated above, some of which are listed below:

1. Straight chain alcohols such as lauryl alcohol, cetyl alcohol, octadecyl alcohol, etc. Mixtures of such alcohols such as the alcoholic mixture derived from the reduction of coconut oil acids and which contain $C_{12}$ and higher and lower alcohols are also useful. One such product is called lorol alcohol.

2. Branched chain alcohols such as are obtained on applying the Oxo reaction (where carbon monoxide and olefins are condensed to produce aldehydes which are then reduced to alcohols) to such olefins as di-, tri-, or tetraisobutylene, polypropylenes, or various polymers obtained in the process of polymerizing low molecular weight olefins.

3. The alcohols obtained on hydration of di-, tri-, or tetra-cyclopentadiene.

4. Alcohols such as are obtainable from cracked waxes.

That the products obtained as outlined above make highly effective asphalt anti-stripping or wetting agents can be seen from the following examples.

EXAMPLE II

*(β-aminoethylamino)-hydroxypropyl nonadecyl ether*

Nonadecyl alcohol which was obtained from $C_{18}$ polypropylene by the Oxo reaction was condensed with epichlorhydrin in the presence of boron fluoride in the usual manner. Without any further purification the condensate was heated for 1 hour at 130°–140° C., with a slight excess of ethylene diamine. The hydrochloride was converted into the free base by treating the former with a slight excess of sodium hydroxide. The amine was obtained as a viscous yellow oil. Without any further purification the product was evaluated as an asphalt wetting agent. Trap-rock containing 2% water and 6% asphalt cut-back was used. The salt of the amine with oleic acid was prepared by mixing equimolar quantities of the free base and salt. This product was likewise evaluated as an asphalt wetting agent.

| Product Tested | Percent Conc. in Asphalt | Mixing Ability | Resistance to Stripping After— | | |
|---|---|---|---|---|---|
| | | | 0 Hr. Cure | 1 Hr. Cure | 2 Hrs. Cure |
| Amine | 2 | 100 | 100 | 100 | 100 |
| Do | 1 | 100 | 50 | 100 | 100 |
| Do | 0.5 | 90 | 5 | 95+ | 100 |
| Do | 0.25 | 90 | 0 | 95+ | 100 |
| Oleic acid salt | 2 | 100 | 95+ | 100 | 100 |
| Do | 1 | 95+ | 60 | 100 | 100 |
| Do | 0.5 | 90+ | 10 | 90 | 100 |

C. *Condensation of β-haloethyl-alkyl sulfides and polyalkylene polyamines*

Effective addition agents can also be prepared by condensing β-chloroethyl-alkyl-sulfides with polyethylene polyamines such as ethylene diamine. Other polyalkylene polyamines may also be used.

The alkyl chain in the β-chloroethyl-alkyl sulfide may be either straight chain or branched chain, though a straight chain seems to be somewhat preferable.

As may be seen from the evaluation data given below, although the free bases are highly potent as asphalt addition agents, certain carboxylic acid salts of the same are even more active.

The β-chloroethyl-alkyl-sulfides may be prepared in various ways, as for example by condensing a mercaptan with an alkylene oxide and by then halogenating the resulting product in any of the well known ways.

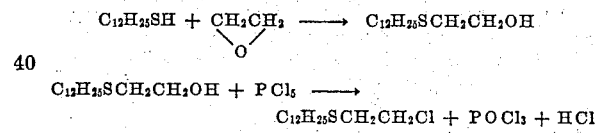

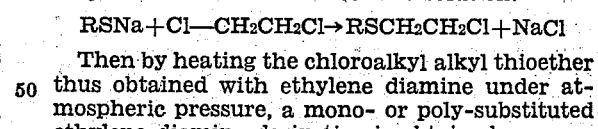

A more convenient method for the preparation of the β-chloroethyl sulfides consists of treating an alkali salt of a mercaptan with an excess of ethylene chloride in an alcoholic solution.

$$RSNa + Cl-CH_2CH_2Cl \rightarrow RSCH_2CH_2Cl + NaCl$$

Then by heating the chloroalkyl alkyl thioether thus obtained with ethylene diamine under atmospheric pressure, a mono- or poly-substituted ethylene diamine derivative is obtained.

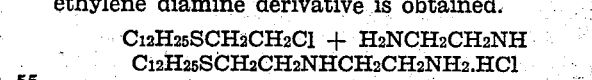

On neutralization with sodium hydroxide, the free base is obtained. These bases are highly effective as asphalt wetting addition agents, and carboxylic acid salts of those are even more effective. Sulfonic acid salts are not only highly active but they are also thermostable, that is, they do not lose their activity on prolonged heating. Evaluation data for some of these products are given below. The methods used in the preparation of some of the intermediates and of the finished products are also described:

EXAMPLE III

A round bottom flask equipped with a return condenser, was charged with 16.2 gms. (0.27 mol) of ethylene diamine and 23.7 gms. (.0896 mol) of β-chloroethyl lorolsulfide, $C_{12}H_{25}SCH_2CH_2Cl$. The mixture was then heated at 135° to 140° C. for 1⅓ hours. The mixture was non-homogeneous to start with and continued to be so throughout the reaction. The reaction product was then cooled, poured into water, neutralized with a slight excess of dilute sodium hydroxide and extracted with ether. The extract was dried over sodium sulfate and the solvent was removed on the steam bath. The residue consisted of 23 gms. of light colored viscous oil which contained 7.22% nitrogen, 10.57% sulfur and only a trace of organic chlorine. Without any further purification the product was blended with asphalt cutback in the concentrations indicated below, and evaluated as an asphalt addition agent, using New Jersey traprock as the other component of the test material. The results of the test are given below. 6% as the asphalt cutback and 94% of the rock aggregate was used in the tests. The tall oil salt of the base was also tested and found to be satisfactory as an anti-stripping agent.

| Product | Percent Conc. in Asphalt | Mixing Ability | Traprock+2% H₂O—Resistance to Stripping After— | | |
|---|---|---|---|---|---|
| | | | 0 Hr. Cure | 1 Hr. Cure | 2 Hrs. Cure |
| Free Base | 2.0 | 100 | 100 | 100 | 100 |
| Do | 1.0 | 95+ | 95+ | 95+ | 100 |
| Do | 0.5 | 95 | 95 | 100 | 100 |
| Do | 0.25 | 90+ | 30 | 95 | 100 |
| Tall oil salt of base | 2.0 | 100 | 100 | 100 | 100 |
| Do | 1.0 | 95+ | 80 | 100 | 100 |
| Do | 0.5 | 95 | 25 | 95+ | 100 |
| Do | 0.25 | 90 | 5 | 95+ | 95+ |
| Asphalt cutback, no additive | | | 5 | 10 | 20 |

EXAMPLE IV

*N-β-tertiaryoctylthioethyl ethylene diamine*

The intermediate tertiaryoctyl-β-chloroethyl sulfide was prepared in the following manner:

To an Erlenmeyer flask containing 200 ml. of absolute ethyl alcohol was added 27 gms. (0.5 mol) of pure sodium methoxide and 73 gms. (0.5 mol) of a tertiaryoctyl mercaptan. This solution was then added slowly, with rapid stirring, to 198 gms. (2 mols) of ethylene chloride. The reaction was rapid and the temperature rose spontaneously to a point where the reaction mixture began to reflux. When all the mercaptide had been added, the heating and stirring was continued for additional four hours. The reaction mixture was then cooled and filtered in order to remove the sodium chloride formed and the filtrate was evaporated to a small volume on the steam bath.

The residue was taken up with water, acidified with concentrated hydrochloric acid and extracted with ether. The extract was washed, dried over sodium sulfate, and the solvent was finally removed on the steam bath. The residual oil was then distilled under 20 m.m. pressure. Practically all the products distilled at 126°–130° C. The distillate may be designated as product A.

The following procedure was used in preparing the desired ethylene diamine derivative:

A round bottom flask equipped with a return condenser and a thermometer, was charged with 13.8 gms. (0.23 mol) of ethylene diamine and 15.6 gms. (0.075 mol) of the above described product A. The mixture was then refluxed at 135°–140° C. for 1½ hours.

The reaction mixture was then poured into a little water, treated with a slight excess of sodium hydroxide, and extracted with ether. The extract was dried over sodium sulfate and filtered. On removal of the ether on the steam bath, 15.5 gms. of viscous yellow oil were obtained. Without any further purification, the product was evaluated as an asphalt wetting addition agent in the same manner as described in Example IV.

| Product | Percent Conc. in Asphalt | Mixing Ability | Traprock+2% H₂O—Resistance to Stripping After— | | |
|---|---|---|---|---|---|
| | | | 0 Hr. Cure | 1 Hr. Cure | 2 Hrs. Cure |
| Free Base | 2.0 | 100 | 95+ | 100 | 100 |
| Do | 1.0 | 100 | 85 | 95+ | 95+ |
| Do | 0.5 | 95+ | 35 | 65 | 85 |
| Do | 0.25 | 95 | 5 | 10 | 40 |
| Tall oil salt of the base | 2.0 | 100 | 95 | 100 | 100 |
| Do | 1.0 | 95+ | 35 | 90 | 95+ |
| Do | 0.5 | 95 | 100 | 35 | 95 |
| Do | 0.25 | 90 | 0 | 15 | 55 |

EXAMPLE V

*N-β-tertiarydodecylthioethyl ethylene diamine*

The above indicated dodecyl derivative was prepared in the same way as was described for the tertiary octyl derivative in the previous experiment. This meant simply that equimolecular proportions of tertiary-dodecyl mercaptan was substituted for the tertiary octyl mercaptan of the preceding experiment. As in the previous experiment, the final product was obtained as a viscous yellow oil. Evaluation data for the N-β-tertiarydodecylthioethyl ethylene diamine are given below:

| Product | Percent Conc. in Asphalt | Mixing Ability | Traprock+2% H₂O—Resistance to Stripping After— | | |
|---|---|---|---|---|---|
| | | | 0 Hr. Cure | 1 Hr. Cure | 2 Hrs. Cure |
| Free base | 2.0 | 100 | 95 | 100 | 100 |
| Do | 1.0 | 95+ | 50 | 90 | 90+ |
| Do | 0.5 | 95 | 15 | 35 | 75 |
| Do | 0.25 | 90 | 5 | 15 | 50 |

From the data it may be seen that the product was active as an asphalt wetting addition agent.

D. *Condensation of alkylphenyl chloroalkyl ethers and polyethylene polyamines*

Highly effective asphalt addition agents can likewise be prepared by condensing alkylphenylchloroalkyl ethers with polyalkylene polyamines such as ethylene diamine.

β-Chloroalkyl-phenyl ethers, such as

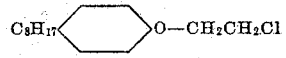

react readily with, for example, ethylene diamine on heating under atmospheric pressure to give salts of the amine derivatives:

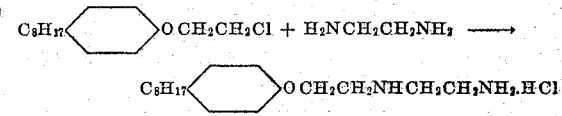

On neutralization with alkali, the free amines are obtained. The bases as such or in the form of carboxylic or sulfonic acid salts make excellent wetting agents when added to asphalts. Salts of monoalkyl sulfates (ROSO₃H) or mono or diesters of phosphoric acid may also be used. The effectiveness of the products of this nature may be seen from the following examples:

EXAMPLE VI

A 3-way flask equipped with a stirrer and a reflux condenser was charged with 56.8 g. (0.2 mol) of tertiary octylphenyl-β-chloroethyl ether,

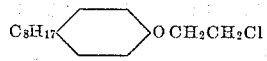

and 12 gms of anhydrous ethylene diamine. The mixture was then heated for one hour at 150°–160° C., whereupon it was cooled and poured into water. A slight excess of dilute sodium hydroxide was then added and the mixture was extracted with ether. The ether extract was then dried over sodium sulfate and filtered. The filtrate was evaporated to dryness on the steam bath.

The residue consisted of 60 gms. of yellow viscous oil which was found to be highly effective as an asphalt addition agent as may be seen from the evaluation data given below:

The stripping tests were run on 6% of rapid curing asphalt cutback type 2, and 94% of wet (2% $H_2O$) New Jersey trap rock. The asphalt cutback conformed to the ASTM specification D597–46.

| Product | Percent Conc. in Asphalt | Mixing Ability | Traprock+2% $H_2O$— Resistance to Stripping After— | | |
|---|---|---|---|---|---|
| | | | 0 Hrs. Cure | 1 Hr. Cure | 2 Hrs. Cure |
| Free Base | 2.0 | 100 | 100 | 100 | 100 |
| Do | 1.0 | 95+ | 95+ | 100 | 100 |
| Do | 0.5 | 95+ | 55 | 100 | 100 |
| Do | 0.25 | 90 | 10 | 95+ | 100 |
| Oleic Acid Salt | 2.0 | 100 | 95+ | 100 | 100 |
| Do | 1.0 | 95+ | 35 | 90 | 100 |
| Do | 0.5 | 90 | 5 | 50 | 100 |
| Do | 0.25 | 85 | 0 | 20 | 90 |

Alkyl phenols can likewise be condensed with epichlorhydrin and by then reacting the resulting chloropropylphenyl ethers with ethylene diamine or other polyethylene polyamines, highly active asphalt wetting addition agents are obtained.

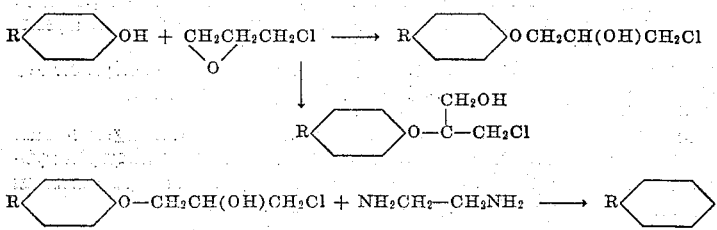

In most cases the reaction with ethylene diamine or with other polyethylene polyamines, can be carried out by merely refluxing a mixture of the two ingredients under atmospheric pressure. The free bases are obtained from the hydrochlorides by neutralization with alkali. Carboxylic and sulfonic acid salts of the free amine products are also highly active as asphalt addition agents, particularly when used on basic rock aggregate such as limestone.

For purposes of illustration the condensations of tertiary octylphenol with epichlorhydrin and of tertiaryoctylphenyl-chloropropyl ether with ethylene diamine are described below. Evaluation data on the diamine derivatives are also given.

EXAMPLE VII

*Tertiaryoctylphenoxy-hydroxypropyl ethylene diamine*

A 3-way flask equipped with a stirrer, a return condenser, a dropping funnel and a thermometer, was charged with 103 gms. (0.5 mol) of freshly distilled tertiaryoctylphenol, 200 ml. chloroform and 5 ml. of boron fluoride-ether complex (45% $BF_3$). The dropping funnel was charged with 46.3 gms. (0.5 mol) of epichlorhydrin. The epichlorhydrin was then added to the reactor drop by drop with rapid stirring and sufficient cooling to keep the reaction temperature between 35° C. and 40° C. When all the chlorhydrin had been added, the mixture was stirred at room temperature for 1½ hours.

On completion of the reaction, the reactor contents were poured into 300 ml. of water and the solution was extracted with chloroform. The extract was then washed with sodium bicarbonate solution and finally dried over sodium sulfate. On removal of the chloroform the residue was analyzed without any further purification:

Found: C=68.00; H=9.37; Cl=11.50; acetyl No.=187.3
Calc.: C=68.34; H=9.38; Cl=12.00; acetyl No.=187.6

This intermediate was used in preparing the desired ethylene diamine derivative.

A round bottom flask equipped with a return condenser and a thermometer, was charged with 44.8 gms. (0.15 mol) of the tertiaryoctylphenyl chlorohydroxypropyl ether described in the preceding experiment. To this was then added 30 gms. (0.5 mol) of ethylene diamine. The mixture was then heated at 145°–150° C. for one hour and forty minutes. Although the solution was homogeneous at the start of the reaction, it was noted that it separated into two layers when a temperature of 120° C. was reached.

The mixture was cooled, diluted with water, treated with a slight excess of sodium hydroxide, and extracted with chloroform. The extract was washed first with a little dilute sodium hydroxide solution and then with water, whereupon it was dried over sodium sulfate. The solution was then filtered and the chloroform was removed on the steam bath. The residue, after the removal of the solvent, consisted of 27.5 gms. of yellow viscous oil.

Without any further purification the oil was evaluated as an asphalt addition agent in the concentrations indicated below. New Jersey traprock and rapid curing asphalt cutback, type 2, were used in the tests. The asphalt and traprock were used in the ratio of 6% asphalt cutback blend and 94% traprock.

| Product | Percent Conc. in Asphalt | Mixing Ability | Traprock+2% $H_2O$— Resistance to Stripping After— | | |
|---|---|---|---|---|---|
| | | | 0 Hr. Cure | 1 Hr. Cure | 2 Hrs. Cure |
| Free Base | 2.0 | 100 | 90 | 100 | 100 |
| Do | 1.0 | 95 | 70 | 100 | 100 |
| Do | 0.5 | 90+ | 10 | 25 | 90 |
| Do | 0.25 | 90 | 0 | 15 | 95 |
| Asphalt cutback without an agent | | 90 | 5 | 10 | 20 |

E. Condensation of arylalkyl halides and polyethylene polyamines

Contrary to current belief it has been found that the presence of aromatic groups in an amine does not in any way interfere with its activity as an asphalt wetting agent, so long as the amino or polyamino groups are linked to an aliphatic carbon atom rather than being linked directly to the aromatic nucleus. Thus, it is possible to prepare highly active asphalt addition agents from alkylated aromatics by chlorinating the latter in such.

For instance, good results were obtained on chlorination of dodecylbenzene with subsequent condensation of the resulting halide, with ethylene diamine.

In general, similar results may be obtained by condensing alkylated aromatics with formaldehyde in the presence of hydrogen chloride and by then condensing the chloromethylated aromatics with polyalkylene diamines.

The reactions involved may be illustrated in the chemical equations given below:

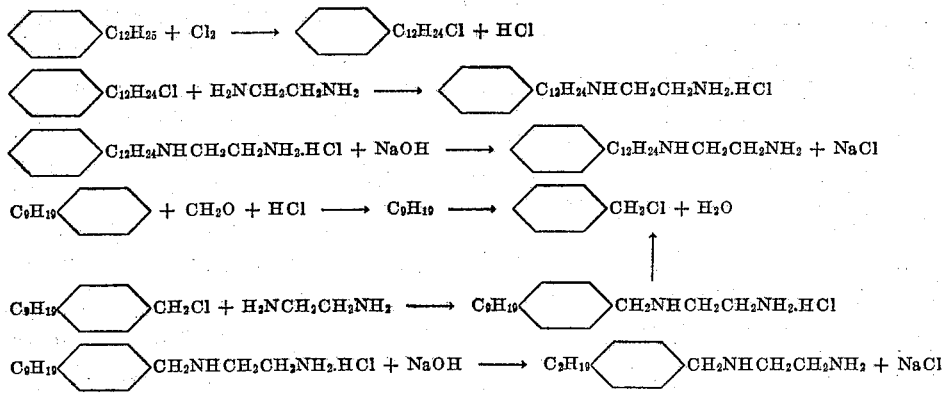

The free bases as well as sulfonic or carboxylic acid salts of the bases make effective addition agents for improving the adhesivity of asphalts to the rock aggregate.

Any alkylated aromatic such as various fractions of aromatic petroleum distillates may also be used for this purpose. Synthetic alkylated aromatics are equally useful.

Methods are described below for the preparation of the intermediates as well as of some of the final products.

F. Condensation of polyalkylarylalkyl halides and ethylene diamine

EXAMPLE VIII

*Tetramethylbenzyl ethylene diamine*

A petroleum distillate consisting primarily of a mixture of tetramethyl benzenes was chloromethylated by condensation with formaldehyde and hydrogen chloride in the following manner:

A 3-way flask fitted with a stirrer, a return condenser, a thermometer, and an inlet tube for the introduction of hydrogen chloride, was charged with 201 gms. (1.5 moles) of crude tetramethyl benzenes, 45 gms. (1.5 moles) of trioxymethylene, and 50 ml. of 85% phosphoric acid. Rapid stream of hydrogen chloride was then passed through the mixture and the temperature was raised to 80° C. This mixture was rapidly stirred throughout the reaction. Then, while maintaining the temperature at 80° C. the stirring and passage of the hydrogen chloride was continued for four hours.

The mixture was then cooled, poured into water and extracted with ether. The extract was washed several times with water and then dried over sodium sulfate.

On removal of the ether on the steam bath, a residue consisting of 246 gms. of yellow oil was obtained. This residue may be designated as product B. That the product contained slightly more than one chloromethyl group per molecule of substance may be seen from the analysis given below.

Found: C=73.04; H=9.03; Cl=18.54
$C_{11}H_{15}Cl$, Calc.: C=72.33; H=8.33; Cl=13.96

This product B, whose preparation is described above, was condensed with ethylene diamine as described below:

A 3-way flask fitted with a stirrer, a return condenser, a thermometer, and a dropping funnel was charged with 45 gms. (0.75 mole) of ethylenediamine, while the dropping funnel was charged with 45.6 gms. (0.25 mole) of product B described in the preceding experiment. The chloride was added to the diamine little by little with rapid stirring and sufficient cooling to keep the reaction temperature below 60° C. The mixture was then heated for 1 hr. at 100° C.

On completion of the reaction, the product was poured into water and extracted with ether after neutralization with 25% sodium hydroxide. The extract was washed and finally dried over sodium sulfate. On removal of the ether on the steam bath the reaction product was obtained as a yellow viscous oil, weighing 38.8 gms. Without any further purification, the product was evaluated as an asphalt addition agent. Traprock containing 2% water was used as the rock aggregate. The ratio of the two ingredients used in the tests was 6% of the asphalt blend to 94% of the rock aggregate. That the product was highly active as an asphalt addition agent may be seen from the data given below:

| Product | Percent Conc. in Asphalt | Mixing Ability | Traprock+2% $H_2O$—Resistance to Stripping After— | | |
|---|---|---|---|---|---|
| | | | 0 Hr. Cure | 1 Hr. Cure | 2 Hrs. Cure |
| Free Base | 2.0 | 100 | 100 | 100 | 100 |
| Do | 1.0 | 100 | 90 | 100 | 100 |
| Do | 0.5 | 100 | 15 | 60 | 95 |
| Do | 0.25 | 95 | 5 | 25 | 90 |
| Asphalt without additive | | 90 | 5 | 10 | 20 |

EXAMPLE IX

*Trimethylbenzyl ethylene diamine*

1. Trimethyl-chloromethyl benzene was prepared by condensing crude trimethyl benzene with formaldehyde and hydrogen chloride in a manner exactly analogous to the method used in the condensation of tetramethyl benzene with formaldehyde and hydrogen chloride described in the preceding experiment. In this case the chloromethyl derivative so produced was found to contain 17.65% chlorine. For convenience this material may be designated as product C.

Product C was condensed with ethylene diamine and the reaction product isolated in exactly the same way as was described for the preparation of the diamine in the preceding experiment. The finished product was obtained as a yellow viscous oil, which was evaluated as an asphalt addition agent in the manner described above for the corresponding tetramethyl derivative. The data so obtained are tabulated below.

| Product | Percent Conc. in Asphalt | Mixing Ability | Traprock+2% H₂O— Resistance to Stripping After— | | |
|---|---|---|---|---|---|
| | | | 0 Hr. Cure | 1 Hr. Cure | 2 Hrs. Cure |
| Free Base | 2.0 | 100 | 100 | 100 | 100 |
| Do | 1.0 | 100 | 90 | 95+ | 100 |
| Do | 0.5 | 95+ | 35 | 90 | 100 |
| Do | 0.25 | 95 | 5 | 45 | 95+ |

2. In this case the trimethyl chloromethyl benzene was prepared by direct chlorination of tetramethyl benzene. The procedure was as follows:

A small reaction bottle was charged with 71 gms. of crude tetramethyl benzene and 3 gms. of phosphorus trichloride. A rapid stream of chlorine was then passed through the liquid at about 80° C.; Alundum thimble was used to disperse the chlorine. The passage of the chlorine was continued for 2 hrs. or until 18.8 gms. of chlorine had been absorbed. The reaction mixture was then cooled, poured into water and extracted with ether. The extract was dried over sodium sulfate. On removal of the solvent on the steam bath, 74.8 gms. of orange-colored liquid were obtained as a residue. The product contained 22.69% chlorine.

Condensation of the above described chloro derivative with ethylene diamine was carried out exactly as described for similar condensations in the preceding examples. The finished diamine was obtained as a dark red liquid which still contained some chlorine. The presence of the chlorine did not seem to interfere with the activity of the base as may be seen from the evaluation data given below.

| Product | Percent Conc. in Asphalt | Mixing Ability | Traprock+2% H₂O— Resistance to Stripping After— | | |
|---|---|---|---|---|---|
| | | | 0 Hr. Cure | 1 Hr. Cure | 2 Hrs. Cure |
| Free Base | 2.0 | 100 | 80 | 95 | 100 |
| Do | 1.0 | 100 | 40 | 90 | 95+ |
| Do | 0.5 | 95 | 10 | 45 | 95+ |
| Do | 0.25 | 90 | 0 | 30 | 65 |

What is claimed:

1. An improved bituminous bonding composition comprising a mixture of asphalt and at least one anti-stripping addition agent selected from the group consisting of the free amine base and salts of the free amine base of the condensation product of ethylene diamine and an alkylthio substituted alkyl halide, said alkylthio substituted alkyl halide containing only carbon, hydrogen, oxygen, sulfur and halogen elements, and having an alkyl radical of 10 to 24 carbon atoms.

2. The composition defined by claim 1, wherein the said alkylthio substituted alkyl halide is β-haloethyl-alkyl sulphide.

3. The composition defined by claim 2, wherein the said β-haloethyl-alkyl sulphide is β-chloroethyl-alkyl sulphide.

4. The composition defined by claim 2, wherein the said β-halo-ethyl-alkyl sulphide is β-chloroethyl-lorolsulfide.

5. The composition defined by claim 2, wherein the said β-haloethyl-alkyl sulphide is tertiary-octyl-β-chloroethyl sulphide.

6. The composition defined by claim 1, wherein the said β-haloethyl-alkyl sulphide is tertiary-dodecyl-β-chloroethyl sulphide.

LOUIS A. MIKESKA.

REFERENCES CITED

The following references are of record in the file of this patent:

UNITED STATES PATENTS

| Number | Name | Date |
|---|---|---|
| 2,191,295 | Dohse et al. | Feb. 20, 1940 |
| 2,246,524 | Kyrides | June 24, 1941 |
| 2,378,235 | Miles | June 12, 1945 |
| 2,461,971 | Fischer | Feb. 15, 1949 |
| 2,482,536 | Hershberger et al. | Sept. 20, 1949 |

FOREIGN PATENTS

| Number | Country | Date |
|---|---|---|
| 560,716 | Great Britain | Apr. 18, 1944 |